United States Patent
Sawant et al.

(10) Patent No.: US 11,977,031 B2
(45) Date of Patent: May 7, 2024

(54) SYSTEM AND METHOD OF DETECTING CONCENTRATION OF PLURALITY OF CHEMICAL RESIDUE IN AN AGRICULTURAL PRODUCE

(71) Applicant: Tata Consultancy Services Limited, Mumbai (IN)

(72) Inventors: Suryakant Ashok Sawant, Thane (IN); Jayantrao Mohite, Thane (IN); Srinivasu Pappula, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/753,540

(22) PCT Filed: Mar. 22, 2021

(86) PCT No.: PCT/IB2021/052358
§ 371 (c)(1),
(2) Date: Mar. 7, 2022

(87) PCT Pub. No.: WO2021/191770
PCT Pub. Date: Sep. 30, 2021

(65) Prior Publication Data
US 2022/0349828 A1  Nov. 3, 2022

(30) Foreign Application Priority Data
Mar. 26, 2020 (IN) .............................. 202021013241

(51) Int. Cl.
G01N 21/84 (2006.01)
G01N 21/33 (2006.01)
(Continued)

(52) U.S. Cl.
CPC ............. *G01N 21/84* (2013.01); *G01N 21/33* (2013.01); *G01N 21/359* (2013.01); *G01N 21/64* (2013.01);
(Continued)

(58) Field of Classification Search
CPC ...... G01N 21/84; G01N 21/33; G01N 21/359; G01N 21/64; G01N 2021/8466;
(Continued)

(56) References Cited

U.S. PATENT DOCUMENTS 6,646,264 B1   11/2003   Modiano et al.
8,502,974 B2   8/2013    Johnsen
(Continued)

FOREIGN PATENT DOCUMENTS

CN   104865194 A   8/2015
CN   107976428 A   5/2018
(Continued)

OTHER PUBLICATIONS

Chen et al., Pesticide Residue Detection by Hyperspectral Imaging Sensors, 2015, 7th Workshop on Hyperspectral Image and Signal Processing: Evolution in Remote Sensing, pp. 1-4. (Year: 2015).*
(Continued)

*Primary Examiner* — Christine S. Kim
(74) *Attorney, Agent, or Firm* — Finnegan, Henderson, Farabow, Garrett & Dunner LLP

(57) ABSTRACT

A processor implemented method of detecting a concentration of plurality of chemical residue in an agricultural produce is provided. The method include (a) receiving, by a hyper spectral device, a data set associated with one or more reflectance measurements of the agricultural produce; (b) determining, data associated with a plurality of bands; (c) dynamically reiterating, the steps (a) and (b) at predetermined time interval to obtain a trained dataset; (d) deter-
(Continued)

mining, relevant wavelengths among the selected trained data sets based on a feature selection technique to form an array of emitters; (e) calibrating, by the identified array of emitters, to emit light on the detecting region of one or more sample of the agricultural produce to obtain data associated with reflectance and transmittance; and (f) calculating, a calibration index with a de-multiplication flag to detect presence or absence of the plurality of chemical residue in the agricultural produce.

15 Claims, 4 Drawing Sheets

(51) Int. Cl.
  *G01N 21/359* (2014.01)
  *G01N 21/64* (2006.01)
(52) U.S. Cl.
  CPC ............... *G01N 2021/8466* (2013.01); *G01N 2201/0627* (2013.01)
(58) Field of Classification Search
  CPC .......... G01N 2201/0627; G01N 21/31; G01N 21/6486; G01N 2021/3181; G01N 2201/1293; G01N 21/255
  See application file for complete search history.

(56) References Cited

U.S. PATENT DOCUMENTS

| | | | |
|---|---|---|---|
| 9,164,032 B2 | 10/2015 | Islam | |
| 11,022,494 B2 | 6/2021 | Gensemer et al. | |
| 2015/0289557 A1* | 10/2015 | Deevi | G06T 7/0008 356/326 |
| 2019/0277695 A1 | 9/2019 | Gensemer et al. | |
| 2020/0111342 A1* | 4/2020 | Hummer | G06K 19/0717 |
| 2021/0365683 A1* | 11/2021 | Badhwar | G06V 20/20 |

FOREIGN PATENT DOCUMENTS

| | | | | |
|---|---|---|---|---|
| CN | 108872091 A | * | 11/2018 | ............. G01N 21/25 |
| CN | 112586654 A | * | 4/2021 | |

OTHER PUBLICATIONS

Ren et al., Identification of Different Concentrations Pesticide Residues of Dimethoate on Spinach Leaves by Hyperspectral Image Technology, 2018, IFAC Papers on Line 51-17, pp. 758-763. (Year: 2018).*

Thomas et al., Benefits of hyperspectral imaging for plant disease detection and plant protection: a technical perspective, 2018, J Plant Dis Prot, vol. 25, pp. 5-20. (Year: 2018).*

Datt, A. et al., "Detection of pests and diseases in vegetable crops using hyperspectral sensing: comparison of reflectance data for different sets of symptoms", conference of the Spatial Sciences Institut, Date: Jan. 2005, Publisher: Research Gate, https://www.researchgate.net/publication/228807985_Detection_of_pests_and_diseases_in_vegetable_crops_using_hyperspectral_sensing_a_comparison_of_reflectance_data_for_different_sets_of_symptoms/link/0fcfd5145a42bbc999000000/download.

Jun, Sun et al., "Identification of pesticide residue level in lettuce based on hyperspectra and chlorophyll fluorescence spectra", International Journal of Agricultural and Biological Engineering, Date: Dec. 2016, vol. 9, No. 6, Publisher: ijabe.org, https:/hortintl.cals.ncsu.edu/sites/default/files/documents/identificationofpesticideresiduelevelinlettucebasedonhyperspectraandchlorophyllfluorescencespectra.pdf.

International Search Report and Written Opinion dated Jul. 14, 2021, in International Application No. PCT/IB2021/052358; 10 pages.

* cited by examiner

SYSTEM AND METHOD OF DETECTING CONCENTRATION OF PLURALITY OF CHEMICAL RESIDUE IN AN AGRICULTURAL PRODUCE

CROSS-REFERENCE TO RELATED APPLICATIONS AND PRIORITY

The present application is a U.S. National Stage Filing under 35 U.S.C. § 371 and claims priority from International Application No. PCT/162021/052358 filed on Mar. 22, 2021, which application claims priority under 35 U.S.C. § 119 from India Application No. 202021013241, filed on Mar. 26, 2020. The entire contents of the aforementioned applications are incorporated herein by reference.

TECHNICAL FIELD

This disclosure relates generally to chemical residue detection system, and, more particularly, to system and method of detecting concentration of plurality of chemical residues in an agricultural produce using non-invasive hyperspectral sensing.

BACKGROUND

At present scenario, uncontrolled application of agro-chemicals has led to increase in chemical residue levels. The awareness about agro-chemical residue levels is increasing internationally and maximum residue levels are becoming stringent day-by-day. For example, uncontrolled use of pesticides during crop production is causing serious concerns. For example, Tea is one of the important commercial commodities widely traded across globe. Due to changing weather conditions Tea plantations often get infested with various pest and diseases that cause serious economic losses. To overcome such pest/disease infestations growers follow agro-chemical application over the crop. Traditionally tea estates were managed over the large areas for both cultivation and leaf processing. However, due to acute labor shortage the Tea estates are getting divided into smaller units called as small tea growers. Also, internationally the quality parameters for Tea import and export are getting stringent on agro-chemical residue levels.

The improper crop management practices are one of the reasons for increasing amount of pesticide residue is food material. Also, use of banned pesticides is affecting the international trade of food materials. In Tea cultivation the use of pesticides is very high, as a result the amount of pesticide residue is detected above the permissible levels. The shelf life (i.e., storage time after harvest) of Green Tea leaves is very short and traditional methods of pesticide residue detection are time consuming. The traditional methods of chemical analysis (e.g., Liquid Chromatography, Gas Chromatography, Fourier Transform Infrared Spectroscopy (FTIR), etc.) are invasive methods, time consuming and require sophisticated infrastructure. Unavailability of non-destructive methods for toxic chemical residue detection results in a significant loss in terms of quality of processed produce. Unavailability of hand-held/portable integrated device for toxic chemical residue detection.

SUMMARY

Embodiments of the present disclosure present technological improvements as solutions to one or more of the above-mentioned technical problems recognized by the inventors in conventional systems. For example, in one aspect, a processor implemented method of detecting a concentration of plurality of chemical residue in an agricultural produce is provided. The processor implemented method includes at least one of: receiving, by a hyper spectral device, a data set associated with one or more reflectance measurements of the agricultural produce; determining, via one or more hardware processors, data associated with a plurality of bands; dynamically reiterating, via the one or more hardware processors, the steps of the receiving and the determining at predetermined time interval to obtain a trained dataset; determining, via the one or more hardware processors, relevant wavelengths among the selected trained data sets based on a feature selection technique to form an array of emitters; calibrating, by the identified array of emitters, to emit light on the detecting region of one or more sample of the agricultural produce to obtain data associated with reflectance and transmittance; and calculating, via the one or more hardware processors, a calibration index with a de-multiplication flag to detect presence or absence of the plurality of chemical residue in the agricultural produce. In an embodiment, the data set associated with one or more reflectance measurements of the agricultural produce comprise concentrations of the mentioned plurality of chemical residue. In an embodiment, the plurality of band corresponds to wavelength band of one or more light emitting sources. In an embodiment, one or more light emitting sources corresponds to one or more light emitting diodes (LED).

In an embodiment, the feature selection technique may correspond to at least one of (i) a genetic algorithm, (ii) a classification algorithm, and combination thereof. In an embodiment, one or more center wavelengths of each of the LED and associated with a spectral response function subset to obtain observations for one or more bandwidths of the LED. In an embodiment, the method may further comprise, determining, via one or more hardware processors, at least one of (i) fluorescence based on excitation of the one or more sample of the agricultural produce, and (ii) intensity of fluorescence by array of detector LED's and Charge Coupled Devices (CCD's). In an embodiment, the hyper spectral device may be non-invasive.

In another aspect, there is provided a processor implemented system for detection of a concentration of plurality of chemical residue in an agricultural produce is provided. The system comprises a memory storing instructions; one or more communication interfaces; and one or more hardware processors coupled to the memory via the one or more communication interfaces, wherein the one or more hardware processors are configured by the instructions to: receive, by a hyper spectral device, a data set associated with one or more reflectance measurements of the agricultural produce; determine data associated with a plurality of bands; dynamically reiterate the steps of the receiving and the determining at predetermined time interval to obtain a trained dataset; determine relevant wavelengths among the selected trained data sets based on a feature selection technique to form an array of emitters; calibrate by the identified array of emitters, to emit light on the detecting region of one or more sample of the agricultural produce to obtain data associated with reflectance and transmittance; and calculate a calibration index with a de-multiplication flag to detect presence or absence of the plurality of chemical residue in the agricultural produce. In an embodiment, the data set associated with one or more reflectance measurements of the agricultural produce comprise concentrations of the mentioned plurality of chemical residue. In an embodiment, the plurality of band corresponds to wavelength band of one or more light emitting sources. In an embodiment, one or more light emitting sources corresponds to one or more light emitting diodes (LED).

In an embodiment, the feature selection technique may correspond to at least one of (i) a genetic algorithm, (ii) a classification algorithm, and combination thereof. In an embodiment, one or more center wavelengths of each of the LED and associated with a spectral response function subset to obtain observations for one or more bandwidths of the LED. In an embodiment, one or more hardware processors may be further configured to determine at least one of (i) fluorescence based on excitation of the one or more sample of the agricultural produce, and (ii) intensity of fluorescence by array of detector LED's and Charge Coupled Devices (CCD's). In an embodiment, the hyper spectral device may be non-invasive.

In yet another aspect, there are provided one or more non-transitory machine readable information storage mediums comprising one or more instructions which when executed by one or more hardware processors causes at least one of: receiving, by a hyper spectral device, a data set associated with one or more reflectance measurements of the agricultural produce; determining, data associated with a plurality of bands; dynamically reiterating, the steps of the receiving and the determining at predetermined time interval to obtain a trained dataset; determining, relevant wavelengths among the selected trained data sets based on a feature selection technique to form an array of emitters; calibrating, by the identified array of emitters, to emit light on the detecting region of one or more sample of the agricultural produce to obtain data associated with reflectance and transmittance; and calculating, a calibration index with a de-multiplication flag to detect presence or absence of the plurality of chemical residue in the agricultural produce. In an embodiment, the data set associated with one or more reflectance measurements of the agricultural produce comprise concentrations of the mentioned plurality of chemical residue. In an embodiment, the plurality of band corresponds to wavelength band of one or more light emitting sources. In an embodiment, one or more light emitting sources corresponds to one or more light emitting diodes (LED).

In an embodiment, the feature selection technique may correspond to at least one of (i) a genetic algorithm, (ii) a classification algorithm, and combination thereof. In an embodiment, one or more center wavelengths of each of the LED and associated with a spectral response function subset to obtain observations for one or more bandwidths of the LED. In an embodiment, one or more hardware processors may be further configured for determining at least one of (i) fluorescence based on excitation of the one or more sample of the agricultural produce, and (ii) intensity of fluorescence by array of detector LED's and Charge Coupled Devices (CCD's). In an embodiment, the hyper spectral device may be non-invasive.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1A:
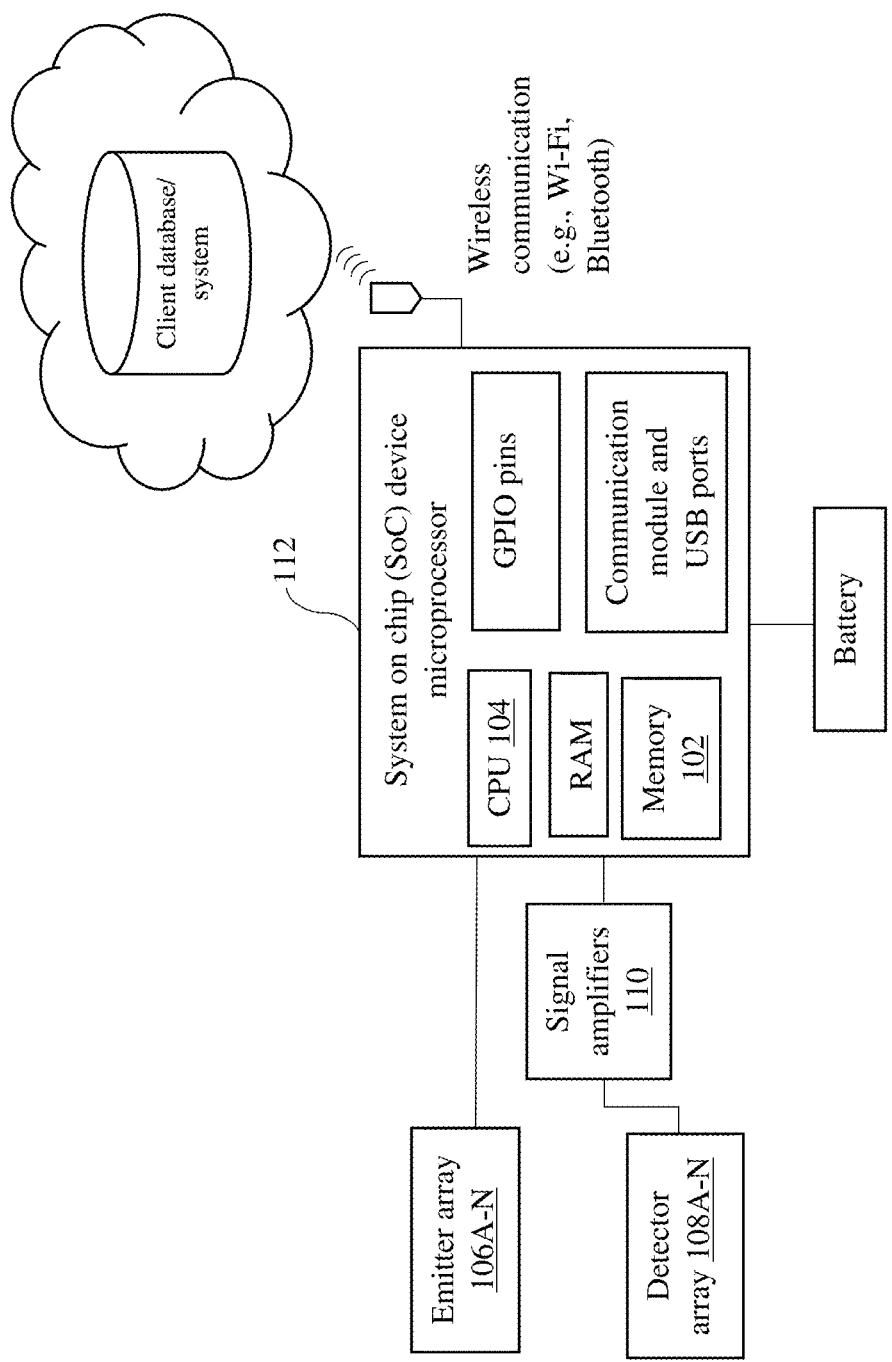
FIGS. 1A and 1B illustrates a system for detection a concentration of plurality of chemical residues in an agricultural produce, according to embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

There is a need for system and method for quick, non-destructive detection of pesticide residue. The disclosure of the present embodiment provides a chemical reside concentration detection device and method for chemical (e.g., pesticide) residue detection in crop leaves using non-invasive hyper spectral sensing. The hyper spectral sensing is a collection of light intensity in multiple narrow wavelength bands. The device includes one or more emitters and detectors respectively placed in specific arrangement to measure absorbance and transmittance of light in various wavelengths, and a method based on machine learning that categorizes the chemical residue. The pesticide is a chemical formulation used to reduce impact of insect pests on a crop growth. Pesticide residue refers to the pesticides that may remain on or in food after they are applied to food crops. The pesticide residue often enters human food system and initiate one or more serious health implications.

Referring now to the drawings, and more particularly to FIGS. 1 through_2B, where similar reference characters denote corresponding features consistently throughout the figures, there are shown preferred embodiments and these embodiments are described in the context of the following exemplary system and/or method.

Figure 1B:
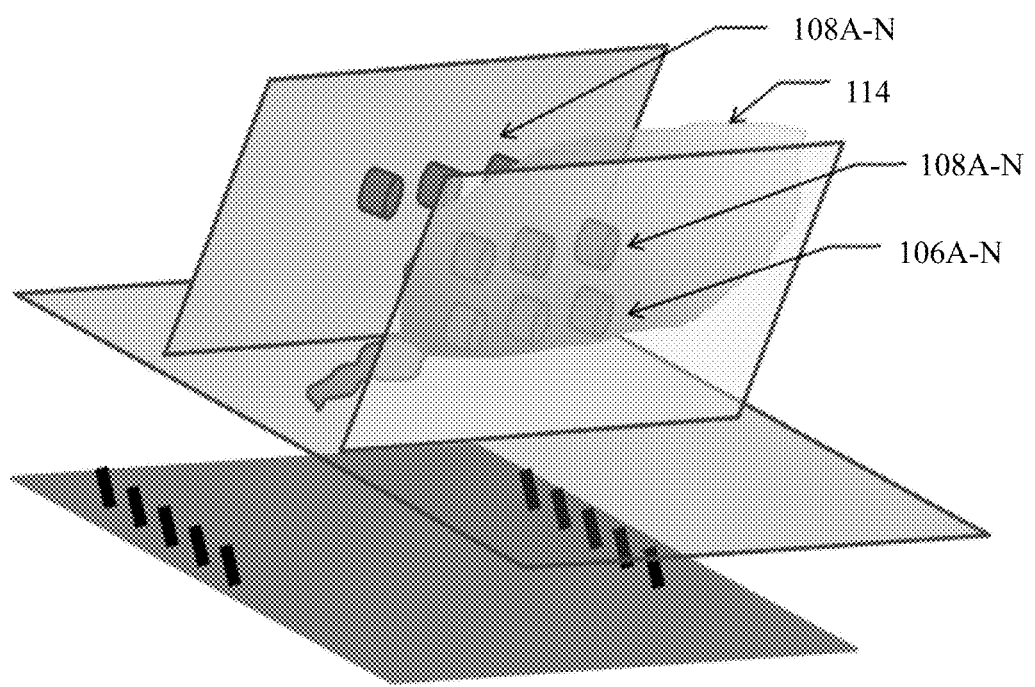

FIGS. 1A and 1B illustrates a system for detection a concentration of plurality of chemical residue in an agricultural produce, according to embodiments of the present disclosure. In an embodiment, the system 100 includes one or more processors 104, communication interface device(s) or input/output (I/O) interface(s) (not shown in figure), and one or more data storage devices or memory 102 operatively coupled to the one or more processors 104. The memory 102 comprises a database (not shown in figure). The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) (not shown in figure) can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 102 includes a plurality of modules and a repository for storing data processed, received, and generated by the plurality of modules. The plurality of modules may include routines, programs, objects, components, data structures, and so on, which perform particular tasks or implement particular abstract data types.

Further, the database (not shown in figure) stores information pertaining to inputs fed to the system 100 and/or outputs generated by the system 100 (e.g., data/output generated at each stage of the data processing), specific to the methodology described herein. More specifically, the database (not shown in figure) stores information being processed at each step of the proposed methodology.

The repository, amongst other things, includes a system database and other data. The other data may include data generated as a result of the execution of one or more modules in the plurality of modules.

Further, the database (not shown in figure) stores information pertaining to inputs fed to the system 100 and/or outputs generated by the system (e.g., at each stage), specific to the methodology described herein. More specifically, the database (not shown in figure) stores information being processed at each step of the proposed methodology.

The chemical residue concentration detection system 100 includes a plurality of emitter array 106A-N are an array of LED's to illuminate at least one material under observation and a plurality of detector array 108A-N are an array of LED's and photodiodes to measure a light intensity. In an embodiment, the emitters are an array of Light Emitting Diodes (LED's) of various wavelength bands (399.92, 453.23, 520.04, 596.96, 633.75, 958.65 nm, Wide band 350-700 nm, 700-1050 nm). In an embodiment, the emitters are arranged in a circular pattern (e.g., at an angle of 30 degrees) to illuminate the target under observation. In an embodiment, the detectors are array LED's of various wavelength bands (399.92, 453.23, 520.04, 596.96, 633.75, 958.65 nm, Wide band 350-700 nm, 700-1050 nm) and Charge Coupled Device (CCD's) of broad-spectrum (350 to 1050 nanometer wavelength). In an embodiment, the reflectance is measured by placing the at least one detector 108A-N above the illuminated area, and to measure transmittance, the at least one detector 108A-N placed below the illuminated area.

In an embodiment, material-specific emitters are switched "On" for a specific (pre-defined or configurable) interval, and the detectors are turned "On" to detect the intensity of fluorescent light. A signal amplifier 110 is an electronic circuit to amplify intensity of detected light spectrum. A system on chip (SoC) computing module 112 include a software embedded to perform a plurality of functions. In an embodiment, the plurality of functions includes at least one of: (a) a detector switching (i.e., on/off), (b) an emitter switching (i.e., on/off), (c) measurement of light intensity, (d) storage of measured observations, (e) classification of an object 114 under observation into various categories, and (f) transmitting observations and results to network connected devices. In an embodiment, the SoC computing module 112 is configured to activate (switch ON/OFF) the emitters, connects with the signal amplifier 110 to measure the light intensity, converts the electric signal into the light intensity, performs classification of leaves into treated vs non-treated or pesticide residue vs non pesticide residue leaves. In an embodiment, the object 114 corresponds to at least one of but not limited to a plant leaf, a grain.

In an embodiment, a reflectance is measured on side of emitter and transmittance is measures on opposite side of the object 114. In an embodiment, the reflectance is an amount of light returned from the object 114. For example, the reflectance is the light returned from at least one of the leaf, the leaves or the grain. Transmittance is an amount of light that passes through the object 114. For example, the transmittance is the light that pass out from at least one of the leaf, the leaves or the grain to the other side. Absorbance is an amount of light that get absorbed into the object 114 (i.e., light never returns out of the object). The hyper spectral sensing in which a light spectrum from range of 500-600 nanometer can be divided into one part of 100 nanometer. If the same spectrum is divided into smaller wavelengths of 1 nanometer each then 100 bands of 1 nanometer wavelength is obtained.

In an embodiment, the plurality of emitter array 106A-N of specific wavelength (e.g., UV/NIR) are activated and a fluorescence signal is measured by the plurality of detector array 108A-N placed on both sides of the object 114. For example, detecting a chlorophyll fluorescence, excitation wavelength is UV and detection range is red and NIR region of wavelength spectrum. The chlorophyll fluorescence is light re-emitted by one or more chlorophyll molecules during return from excited to non-excited states. For example, that occurs when an object (i.e., Chlorophyll from plant leaf) is illuminated by the light in Ultra-Violet spectrum (e.g., ~300-350 nm) for certain amount of time window, the object emits light in visible red spectrum (e.g., ~630-650 nm). Spectral signature is a variation of reflectance or emittance of a material with respect to one or more wavelengths (i.e., reflectance/emittance as a function of wavelength). In an embodiment, the material can be classified into different types/categories by using corresponding unique variation of reflectance.

In an exemplary embodiment, identification of device configuration for new material is provided.

Crop: Tea

Pesticide Name: Cypermethrin

Detector: Spectroradiometer (detection range 350 to 1050 nanometer) Source of light: Solar radiation (all wavelengths).

The steps involved in identification of the new material are as listed below:

a) Step 1: Obtaining the reflectance measurements of one or more leaves with various concentrations of mentioned pesticides using a hyper spectral device in the range of 350-1050 nm (213 bands).

Assuming data in band $b_1$ is $r_1$, $b_2$ is $r_2$ and likewise $b_{213}$ is $r_{213}$;
  Where, b=wavelength band, r=reflectance, 1 to n=number of bands.

b) Step 2: Using the center wavelengths of each LED and corresponding spectral response function subset the above observations for LED bandwidths.

Assuming there are 7 LED's and the data in LED $L_1$ is $r_{L1}$ whereas data in LED $L_7$ is $r_{L7}$.

c) Step 3: Sample collection: Iterate step 1 to 2 for 'x' number of times. Divide the x into training and testing set.

Assuming 70 percent observations for training and 30 percent for testing.

d) Step 4: Using combination of feature selection technique such as Genetic Algorithm and classification algorithm such as random forest. Identify the relevant wavelengths among the above selected sets.

Assuming the identified LED's are $L_1$, $L_3$, $L_4$ and $L_7$.

e) Step 5: Self calibration: The device with identified array of LED's emits the light on the detecting region (no sample) and at the same time array of detector LED's and Charge Coupled Devices (CCD's) measure the reflectance and transmittance to eliminate the effect of stray light.

Assuming the measurement for LED 1 is $[r^o_1, t^o_1]$, LED 2 is $[r^o_2, t^o_2]$, . . . , LED n is $[r^o_n, t^o_n]$.
Where, r=reflectance, t=transmittance, o=open, 1 to n=LED number.

f) Step 6: Measurement of reflectance and transmittance: The device with identified array of LED's emits the light on the actual object (single leaf or multiple leaves) and at the same time array of detector LED's and Charge Coupled Devices (CCD's) measure the reflectance and transmittance.

Assuming the measurement in LED 1 is $[r^s_1, t^s_1]$, LED 2 is $[r^s_2, t^s_2]$, . . . , LED n is $[r^s_n, t^s_n]$.
Where, r=reflectance, t=transmittance, s=sample, 1 to n=LED number.

g) Step 7: Algorithm developed in step 4 are applied on the light intensity measured in step 5 and 6 to predict the presence/absence as well as concentration of pesticides.

h) Step 8: Simultaneously, model developed in step 4 can get updated with addition of unknown data in step 7.

In an exemplary embodiment, Training the proposed device for new chemical residue is provided.
  Crop: Tea
  Pesticide Name: Monochrotophos
  Detector: LED's (narrow band) and CCD (Wide band 350-1050 nm)
  Source of light: LED's (399.92, 453.23, 520.04, 596.96, 633.75, 958.65 nm, Wide band 350-700 nm, 700-1050 nm)
    a) Step 1: Self calibration: The device with identified array of LED's emits the light on the detecting region (no sample) and at the same time array of detector LED's and Charge Coupled Devices (CCD's) measure the reflectance and transmittance to eliminate the effect of stray light.
      Assuming the measurement for LED 1 is $[r^o_1, t^o_1]$, LED 2 is $[r^o_2, t^o_2]$, . . . , LED n is $[r^o_n, t^o_n]$.
      Where, r=reflectance, t=transmittance, o=open, 1 to n=LED number.
    b) Step 2: Measurement of reflectance and transmittance: The device with identified array of LED's emits the light on the actual object (single leaf or multiple leaves) and at the same time array of detector LED's and Charge Coupled Devices (CCD's) measure the reflectance and transmittance.
      Assuming the measurement in LED 1 is $[r^s_1, t^s_1]$, LED 2 is $[r^s_2, t^s_2]$, . . . , LED n is $[r^s_n, t^s_n]$.
      Where, r=reflectance, t=transmittance, s=sample, 1 to n=LED number.
    c) Step 3: Measurement of fluorescence: The LED of Ultraviolet wavelength is turned on for excitation of the material (here leaf photosystem) and intensity of fluorescence is measured in array of detector LED's and Charge Coupled Devices (CCD's).
      Assuming the measurement in LED 1 is $[f^s_1]$, LED 2 is $[f^s_2,]$, . . . , LED n is $[f^s_n]$
    Where, f=fluorescence, s=sample, 1 to n=LED number.
    d) Step 4: Sample collection: Iterate step 1 to 3 for 'x' number of times. Divide the x into training and testing set.
      Assuming 70 percent observations for training and 30 percent for testing.
    e) Step 5: Using combination of feature selection technique such as Genetic Algorithm and classification algorithm such as random forest. Identify the relevant features for achieving the higher accuracy. Identify the algorithm for classification.
      Assuming the identified features are $r^s_1$, $r^s_3$, $t^s_5$ and $f^s_4$;
      Where, r=reflectance, t=transmittance, f=fluorescence.
      Assuming the Random Forest classifier has the highest accuracy.
    f) Step 6: For unknown sample predict using model developed in step 5.
    g) Step 7: Simultaneously, model developed in step 5 get updated with addition of unknown data in step 6.

Use Case for Detection of Pesticide Residue in Leaves:
The method for detection and quantification of pesticide residue in the leaf uses the intensity of reflected light, transmitted light, and chlorophyll fluorescence.
  a) The emitters are switched on in a pre-defined sequence to measure the intensity of reflected light.
  b) The emitters in Ultraviolet (UV) wavelength spectrum are switched on to excite the leaf photosystem, and the detectors in the red and Near Infrared (INR) region are activated to collect the intensity of emitted light (i.e., chlorophyll fluorescence).
  c) The embedded algorithm classifies the intensity of light into the quantity of residue.

Use Case for Detection of Aflatoxin in Grains:
The method for detection and quantification of Aflatoxin in the grain uses the intensity of reflected light, transmitted light, and UV fluorescence.
  a) The emitters are switched on in a pre-defined sequence to measure the intensity of reflected light.
  b) The emitters in Ultraviolet (UV) wavelength spectrum are switched on to excite the fungi on grain, and the detectors in the red and Near Infrared (INR) region are activated to collect the intensity of emitted light (i.e., fluorescence).
  c) The embedded algorithm classifies the intensity of light into the quantity of Aflatoxin.

Figure 2A:
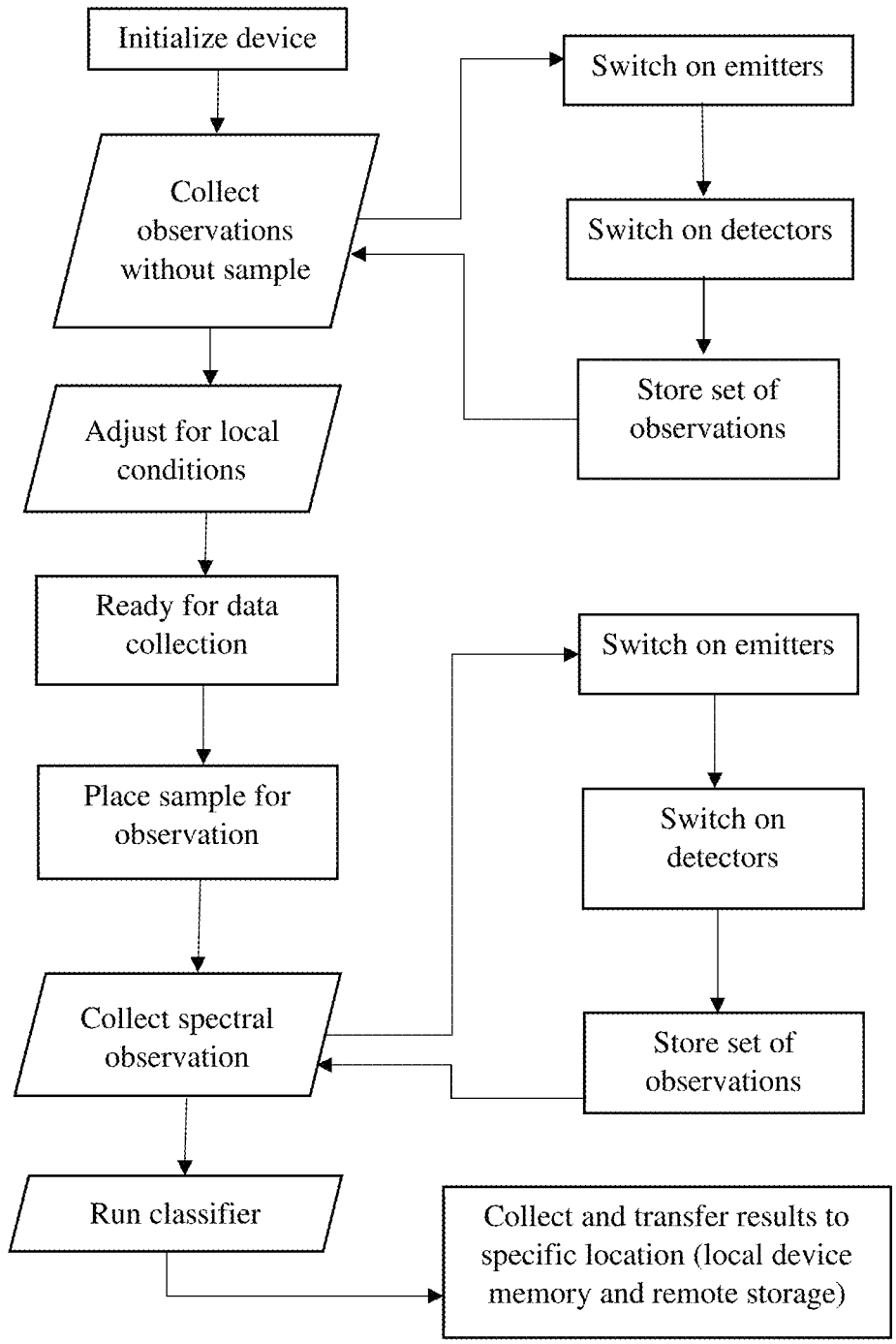
FIG. 2A is an exemplary flow diagram illustrating a method of data collection and analysis while detection of concentration of plurality of chemical residues in the agricultural produce, using the system of FIG. 1, according to some embodiments of the present disclosure.

FIG. 2A is an exemplary flow diagram illustrating a method of data collection and analysis while detection of concentration of plurality of chemical residue in the agricultural produce, using the system of FIG. 1, according to some embodiments of the present disclosure. The initialization of the chemical residue concentration detection device to collect one or more observations without placing a sample for detection. In an embodiment, the chemical residue concentration detection device alternatively referred as a hyper spectral device. The chemical residue concentration detection device is adjusted with respect to local conditions for data collection. A sample is placed for collecting observations to detect concentration of the chemical residue. The chemical residue concentration detection device is configured to collect one or more spectral observations from the sample placed. In an embodiment, a classifier (e.g., machine learning) is run on the obtained one or more spectral observations and resultant is collected and stored in specific location (e.g., a local device memory or a remote storage).

Figure 2B:
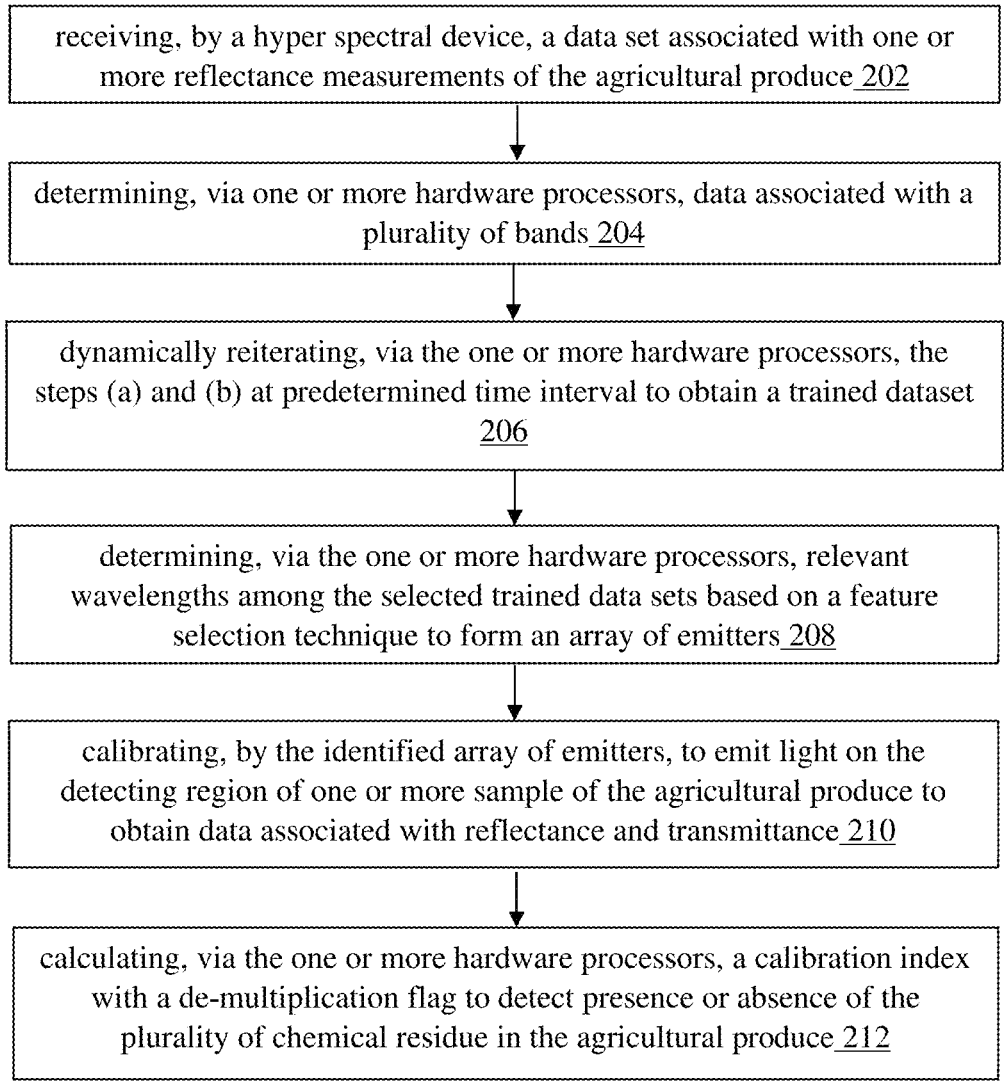
FIG. 2B is an exemplary flow diagram illustrating a method of detecting a concentration of plurality of chemical residues in the agricultural produce, using the system of FIG. 1, according to some embodiments of the present disclosure.

FIG. 2B is an exemplary flow diagram illustrating a method of detecting a concentration of plurality of chemical residue in an agricultural produce, using the system of FIG. 1, according to some embodiments of the present disclosure. In an embodiment, the system 100 comprises one or more data storage devices or the memory 102 operatively coupled to the one or more hardware processors 104 and is configured to store instructions for execution of steps of the method by the one or more processors 104. The flow diagram depicted is better understood by way of following explanation/description. The steps of the method of the present disclosure will now be explained with reference to the components of the system 100 as depicted in FIG. 1.

At step 202, a data set associated with one or more reflectance measurements of the agricultural produce is received by the hyper spectral device. In an embodiment, the data set associated with one or more reflectance measurements of the agricultural produce comprise concentrations of the mentioned plurality of chemical residue. At step 204, a data associated with a plurality of bands is determined. In an embodiment, the plurality of band may correspond to wavelength band of one or more light emitting sources. In an embodiment, one or more light emitting sources may correspond to one or more light emitting diodes (LED). At step 206, the steps (a) and (b) at predetermined time interval is dynamically reiterated to obtain a trained dataset. At step 208, relevant wavelengths are determined among the selected trained data sets based on a feature selection technique to form an array of emitters. At step 210, calibrating, by the identified array of emitters, to emit light on the detecting region of one or more sample of the agricultural produce to obtain data associated with reflectance and transmittance. At step 212, a calibration index with a de-multiplication flag is calculated to detect presence or absence of the plurality of chemical residue in the agricultural produce.

In an embodiment, the feature selection technique may correspond to at least one of (i) a genetic algorithm, (ii) a classification algorithm and combination thereof. In an embodiment, one or more center wavelengths of each of the LED and associated with a spectral response function subset to obtain observations for one or more bandwidths of the LED. In an embodiment, one or more hardware processors may be further configured to determine at least one of (i) fluorescence based on excitation of the one or more sample of the agricultural produce, and (ii) intensity of fluorescence by array of detector LED's and Charge Coupled Devices (CCD's). In an embodiment, the hyper spectral device may be non-invasive.

The embodiments of the present disclosure include the device have plurality of emitters and detectors arranged in a specific configuration that is capable to measure pesticide residue, spectral characteristics and chlorophyll fluorescence in one device, Non-invasive detection through contact, Integrated emitters and detectors with machine learning algorithms facilitate to reduce the time of analysis. The embodiments of the present disclosure facilitate design of a low-cost device comprising of plurality of sensors and detectors arranged in specific configuration to detect and quantify the chemical residue in crop leaves using non-invasive hyper spectral sensing.

The embodiments of the present disclosure are based on a direct exposure of matrix and categorized as a non-destructive. The embodiments of the present disclosure are not specific to a raw material, and can be used for a plant material, example leaf, grains, etc. The embodiments of the present disclosure consider a reflectance, a transmittance in LED wavelengths. The embodiments of the present disclosure consider the fluorescence-based categorization of the material using one or more LED wavelengths. The embodiments of the present disclosure in which the system is capable of detecting the residue on the surface as well as inside the material as both the reflectance and the transmittance is covered.

The embodiments of the present disclosure in which the system include an active source with variable wavelengths that is independent of solar radiation and capable to take observations in any lighting condition and even in dark (optically isolated data collection). The claimed approach is based on reflectance, transmittance and fluorescence light intensity. The combination of reflectance and transmittance helps in measurement of material specific absorption and capable to determine quantities inside material. The hyper spectral device is a portable device enabled with Internet of Things (IoT) capable of collecting measurements and analysis using machine learning/deep learning algorithms in real-time.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

The invention claimed is:

1. A processor implemented method of detecting a concentration of plurality of chemical residue in an agricultural produce, comprising:
   (a) receiving, by a hyper spectral device, a data set associated with one or more reflectance measurements of the agricultural produce, wherein the data set associated with one or more reflectance measurements of the agricultural produce comprise concentrations of the mentioned plurality of chemical residue;
   (b) determining, via one or more hardware processors, data associated with a plurality of bands, wherein the plurality of band corresponds to wavelength band of one or more light emitting sources, wherein one or more light emitting sources corresponds to an array of light emitting diodes (LED's);
   (c) dynamically reiterating, via the one or more hardware processors, the steps (a) and (b) at predetermined time interval to obtain a trained dataset;
   (d) determining, via the one or more hardware processors, relevant wavelengths among the trained dataset based on a feature selection technique to form an array of emitters, wherein the array of emitters are arranged in a circular pattern to emit light;
   (e) calibrating, by the array of emitters, to emit light on a detecting region with no sample and at same time measuring reflectance and transmittance, by an array of detectors, wherein the array of detectors include an array of detector LED's and Charge Coupled Devices (CCD's);
   (f) measuring, by the array of detectors, a data associated with reflectance and transmittance from the detecting region with one or more samples of the agricultural produce, wherein the array of emitters illuminates the detecting region having the one or more samples and at same time the data associated with reflectance and transmittance is measured by the array of detectors, wherein the data associated with the reflectance is measured by placing at least one detector of the array of detectors and the array of emitters on one side of the one or more samples, and the data associated with the transmittance is measured by placing at least one other detector of the array of detectors on opposite side of the one or more samples; and
   (g) predicting, via the one or more hardware processors, presence or absence of the plurality of chemical residue in the agricultural produce using the determined relevant wavelengths and the data associated with reflectance and transmittance.

2. The processor implemented method as claimed in claim 1, wherein the feature selection technique corresponds to at least one of (i) a genetic algorithm, (ii) a classification algorithm, and combination thereof.

3. The processor implemented method as claimed in claim 1, wherein one or more center wavelengths of each of the LED and associated with a spectral response function subset to obtain observations for one or more bandwidths of the LED.

4. The processor implemented method as claimed in claim 1, further comprising, determining, via the one or more hardware processors, at least one of (i) fluorescence based on excitation of the one or more sample of the agricultural produce, and (ii) intensity of fluorescence by the array of detectors.

5. The processor implemented method as claimed in claim 1, wherein the hyper spectral device is non-invasive.

6. A system (100) for detection of a concentration of plurality of chemical residue in an agricultural produce, comprising:
   a memory (102) storing instructions;
   one or more communication interfaces; and
   one or more hardware processors (104) coupled to the memory (102) via the one or more communication interfaces, wherein the one or more hardware processors (104) are configured by the instructions to:
   (a) receive, by a hyper spectral device, a data set associated with one or more reflectance measurements of the agricultural produce, wherein the data set associated with one or more reflectance measurements of the agricultural produce comprise concentrations of the mentioned plurality of chemical residue;

(b) determine, data associated with a plurality of bands, wherein the plurality of band corresponds to wavelength band of one or more light emitting sources, wherein one or more light emitting sources corresponds to an array of light emitting diodes (LED's);

(c) dynamically reiterate, the steps (a) and (b) at predetermined time interval to obtain a trained dataset;

(d) determine, relevant wavelengths among the trained dataset based on a feature selection technique to form an array of emitters, wherein the array of emitters are arranged in a circular pattern to emit light;

(e) calibrate, by the array of emitters, to emit light on a detecting region with no sample and at same time an array of detectors measure reflectance and transmittance, wherein the array of detectors include an array of detector LED's and Charge Coupled Devices (CCD's);

(f) measure, by the array of detectors, a data associated with reflectance and transmittance from the detecting region with one or more samples of the agricultural produce, wherein the array of emitters illuminates the detecting region having the one or more samples and at same time the array of detectors measure the data associated with reflectance and transmittance, wherein at least one detector of the array of detectors and the array of emitters are placed on one side of the one or more samples to measure the data associated with the reflectance, and at least one other detector of the array of detectors is placed on opposite side of the one or more samples to measure the data associated with the transmittance; and (g) predict, presence or absence of the plurality of chemical residue in the agricultural produce using the determined relevant wavelengths and the data associated with reflectance and transmittance.

7. The system (100) as claimed in claim 6, wherein the feature selection technique corresponds to at least one of (i) a genetic algorithm, (ii) a classification algorithm, and combination thereof.

8. The system (100) as claimed in claim 6, wherein the one or more center wavelengths of each of the LED and associated with a spectral response function subset to obtain observations for one or more bandwidths of the LED.

9. The system (100) as claimed in claim 6, wherein the one or more hardware processors is further configured to determine at least one of (i) fluorescence based on excitation of the one or more sample of the agricultural produce, and (ii) intensity of fluorescence by the array of detectors.

10. The system (100) as claimed in claim 6, wherein the hyper spectral device is non-invasive.

11. One or more non-transitory machine-readable information storage mediums comprising one or more instructions which when executed by one or more hardware processors cause:

(a) receiving, by a hyper spectral device, a data set associated with one or more reflectance measurements of the agricultural produce, wherein the data set associated with one or more reflectance measurements of the agricultural produce comprise concentrations of the mentioned plurality of chemical residue;

(b) determining, data associated with a plurality of bands, wherein the plurality of band corresponds to wavelength band of one or more light emitting sources, wherein one or more light emitting sources corresponds to an array of light emitting diodes (LED's);

(c) dynamically reiterating, the steps (a) and (b) at predetermined time interval to obtain a trained dataset;

(d) determining, relevant wavelengths among the trained dataset based on a feature selection technique to form an array of emitters, wherein the array of emitters are arranged in a circular pattern to emit light;

(e) calibrating, by the array of emitters, to emit light on a detecting region with no sample and at same time measuring reflectance and transmittance, by an array of detectors, wherein the array of detectors include an array of detector LED's and Charge Coupled Devices (CCD's);

(f) measuring, by the array of detectors, a data associated with reflectance and transmittance from the detecting region with one or more samples of the agricultural produce, wherein the array of emitters illuminates the detecting region having the one or more samples and at same time the data associated with reflectance and transmittance is measured by the array of detectors, wherein the data associated with the reflectance is measured by placing at least one detector of the array of detectors and the array of emitters on one side of the one or more samples, and the data associated with the transmittance is measured by placing at least one other detector of the array of detectors on opposite side of the one or more samples; and (g) predicting, presence or absence of the plurality of chemical residue in the agricultural produce using the determined relevant wavelengths and the data associated with reflectance and transmittance.

12. The one or more non-transitory machine-readable information storage mediums of claim 11, wherein the feature selection technique corresponds to at least one of (i) a genetic algorithm, (ii) a classification algorithm, and combination thereof.

13. The one or more non-transitory machine-readable information storage mediums of claim 11, wherein one or more center wavelengths of each of the LED and associated with a spectral response function subset to obtain observations for one or more bandwidths of the LED.

14. The one or more non-transitory machine-readable information storage mediums of claim 11, further comprising, determining, at least one of (i) fluorescence based on excitation of the one or more sample of the agricultural produce, and (ii) intensity of fluorescence by the array of detectors.

15. The one or more non-transitory machine-readable information storage mediums of claim 11, wherein the hyper spectral device is non-invasive.

* * * * *